United States Patent Office 3,256,337
Patented June 14, 1966

3,256,337
PROCESS FOR PREPARING ACETYL BUTADIENES
George G. Ecke, Akron, Ohio, assignor to Ethyl Corporation, New York, N.Y., a corporation of Virginia
No Drawing. Original application Mar. 7, 1961, Ser. No. 93,857, now Patent No. 3,149,135, dated Sept. 15, 1964. Divided and this application Aug. 10, 1964, Ser. No. 388,714
8 Claims. (Cl. 260—592)

This application is a division of application Serial No. 93,857, filed March 7, 1961, now U.S. Patent No. 3,149,135.

The present invention relates to butadiene iron subgroup metal tricarbonyl compounds, more particularly to the use of such compounds as well as to products which are thereby made available.

Among the objects of the present invention is the acylation of butadiene iron subgroup metal tricarbonyls.

Additional objects of the present invention include the provision of novel techniques for preparing chemical compounds, and novel compounds that can be so prepared.

The above as well as further objects of the present invention will be more clearly understood from the following description which includes several exemplifications of the invention.

It has been discovered that butadiene iron subgroup metal tricarbonyls can be readily acylated in the presence of Friedel-Crafts catalysts to give good yields of acyl derivatives, and that these acyl derivatives can be readily split to recover an acyl butadiene, free of the metal and of the carbonyl groups present in the original starting material. The above iron subgroup metals are iron, ruthenium, and osmium. The butadiene portion of the butadiene iron subgroup metal tricarbonyls is the conjugated form of butadiene but since this the the only form available in the above metallo tricarbonyls complex, no further identification of the butadiene will be made.

The acylation of the present invention, and especially the good yields it provides, are quite unexpected inasmuch as Friedel-Crafts catalysts are known to cause decomposition of organometallic carbonyls as well as vigorous polymerization of butadiene, and also because extremely poor yields of acylated product are obtained when aliphatic hydrocarbons are acylated.

According to the present invention, butadiene iron subgroup metal tricarbonyls are simply and readily acylated in the presence of Friedel-Crafts catalysts such as $AlCl_3$ or other aluminum halides, iron halides, or zinc halides. Other catalysts as well as the general reaction conditions can be those conventionally used as described in U.S. Patent 2,916,503, granted December 8, 1959, for instance. The reaction of the present invention can be carried out at room temperatures or at elevated or reduced temperatures with substantially no differences in the yield.

The acylation causes the acyl group of the acylating agent to take the place of one of the hydrogens of the butadiene portion of the molecule, and different isomers of the acylated product are formed in accordance with the different isomeric variations that are possible when different hydrogens are thus substituted.

The following examples illustrate the present invention but do not limit it.

EXAMPLE 1

*Acetylation of butadiene iron tricarbonyl*

The reaction was carried out in a 1-liter 3-neck flask, equipped with a condenser, a stirrer, a dropping funnel, a thermometer and a nitrogen inlet tube.

To 31.5 g. (.24 mole) of anhydrous aluminum chloride, slurried with 400 ml. of carbon tetrachloride, there was added 14.6 g. (.20 mole) of acetyl chloride. To this mixture there was added dropwise in a period of 2.5 hours, 38.3 g. (.20 mole) of butadiene iron tricarbonyl diluted to 150 ml. with carbon tetrachloride. A rapid stream of nitrogen was passed through the vigorously stirred solution throughout the addition. The temperature was kept within 3 degrees of 18° C. by controlling the rate of the dropwise addition. After it was completed, the mixture was stirred for 20 minutes, then hydrolyzed with 300 ml. of water added dropwise over 30 minutes, keeping the temperature below 20° C. The red carbon tetrachloride layer which then separated was washed twice with 5% aqueous potassium carbonate solution, then twice with water. The water layers thus separated were combined and neutralized with solid sodium carbonate, thereby depositing a gelatinous material and the resulting slurry was extracted twice with carbon tetrachloride. The extracts were combined with the washed carbon tetrachloride layer and this combined solution dried over magnesium sulfate overnight. The solvent was then removed by evaporation in vacuo. The remaining dark brown-orange solution was filtered and then distilled using a short Vigreux column. Starting material (butadiene iron tricarbonyl) distilled at 26–32° C. with the pressure at 7.0–1.2 mm. of Hg, giving 15.6 g. (41% recovery). The product, acetylbutadiene iron tricharbonyl, was collected at 70–73° C. under a pressure of 0.2 mm. Hg. There was obtained 15.4 g. of product (55% yield based on consumed starting material). The product showed a strong absorption peak at 6.0 mu in the infrared, and gave a red 2,4-dinitrophenylhydrazone melting with decomposition at 194° C. (after recrystallizing from ethyl acetate). The hydrazone derivative analyzed C—43.7%, H—3.04%, and Fe—13.3%, as against theoretical values (for $C_{15}H_{12}FeN_4O_7$) of C—43.3%, H—2.89%, and Fe—13.4%.

EXAMPLE 2

*Benzoylation of butadiene iron tricarbonyl*

The apparatus of Example 1 was used. To 33.4 g. (.25 mole) of anhydrous aluminum chloride, slurried with 400 ml. of carbon tetrachloride in the reaction flask, there was added 29.0 g. (.21 mole) of benzoyl chloride. The addition was accompanied by a temperature rise of 6° C. and some yellowing of the slurry. Then 40.0 g. (.21 mole) of butadiene iron tricarbonyl, diluted to 125 ml. with carbon tetrachloride, was added dropwise over a period of 2.5 hours, keeping the temperature within 3 degrees of 12°C. After the addition was completed, the reaction mixture was stirred for two hours at 15–20° C., then hydrolyzed with 300 ml. of water, added dropwise over a period of 1.5 hours. Nitrogen was passed through the mixture continuously throughout the addition, stirring and hydrolysis. The carbon tetrachloride layer was then permitted to settle, separated and washed three times with 5% aqueous potassium carbonate, then once with water. Each washing produced large amounts of solids at the interface. The combined water layers of the washings was treated with solid sodium carbonate until a color change (yellow to red) occurred, then was extracted twice with carbon tetrachloride. The main carbon tetrachloride layer and the extracts were dried over magnesium sulfate overnight, filtered and combined. The final solution was concentrated by evaporation in vacuo giving a dark brown, viscous liquid. This was diluted with diethylether and cooled in Dry Ice. Extended cooling and scratching produced some crystallization. There was obtained a crop of crude crystal product which was filtered off. This crop was slurried in 50 ml. of 1-N-sodium hydroxide, filtered off again, washed with water, dried, and recrystallized from petroleum ether (B.P. 38–63° C.) to give yellow crystals melting at 84–86° C. and analyzing C—56.5%, H—3.38%, and Fe—18.7%. The theoretical values for $C_6H_5COC_4H_5Fe(CO)_3$ are C—56.4%, H—3.35%, and Fe—18.8%.

EXAMPLE 3

*Propionylation of butadiene ruthenium tricarbonyl*

This reaction is carried out exactly like that in Example 1 except that no nitrogen flushing is used, propionyl chloride is substituted for the acetyl chloride, and butadiene ruthenium tricarbonyl substituted for the corresponding iron compound, both substitutions being on a mole-for-mole basis. (The ruthenium compound is prepared by heating ruthenium pentacarbonyl with 1,3-butadiene in equimolar proportions, in a tetrahydrofuran diluent to 150° C. for 4 hours in an autoclave in an atmosphere of nitrogen.) A yield of propionyl butadiene ruthenium tricarbonyl much poorer than that of Example 1 is obtained from the propionylation.

To check the effect of the nitrogen flushing, Example 1 was repeated without the use of this flush. In the repetition, 35 g. of anhydrous $AlCl_3$ was used, along with 14.6 g. of acetyl chloride, dissolved in 500 ml. carbon tetrachloride. Forty-nine grams of the iron compound was added without prior dilution and the yield of acetyl butadiene iron tricarbonyl, based on consumed iron compound, was 27%.

The lower yield thus obtained is characteristic of the results when the reaction is permitted to proceed without flushing. The flushing action, which can be effected with any gas inert to the reaction conditions, seems to reduce by-product formation, and makes the acylated materials practical intermediates for the production of uncombined acyl butadienes. In addition, the nitrogen, argon, carbon monoxide, hydrogen, carbon dioxide, methane, and other conventional gases, make effective flushing gases.

The uncombined acyl butadienes are readily derived from the acyl butadiene metal tricarbonyls by cleavage with carbon monoxide. This is illustrated by the following example.

EXAMPLE 4

*Cleavage of acetylbutadiene iron tricarbonyl to acetyl butadiene*

A solution of 27.5 g. (.12 mole) of acetyl butadiene iron tricarbonyl (as produced in Example 1) in 800 ml. of tetrahydrofuran was charged into an autoclave and pressured with 400 p.s.i.g. of carbon monoxide. The charge was heated to 175° C. in two hours, then held at 175° C. plus or minus 2° for one hour. A pressure drop of 80 p.s.i. was noticed during the last hour of heating. Then the autoclave was cooled to 25° C. and discharged. The resulting reaction mixture was filtered, the solvent evaporated in vacuo, and the residual concentrated solution filtered and distilled under reduced pressure using a short Vigreux column. A mixture of iron carbonyl and solvent was first driven off and a main fraction was collected at 40–41° C. under a pressure of 4.5 mm. Hg. The total amount of product obtained was 4.8 g. (41% of theory).

The infrared spectrum of the product showed a doublet in the 6 mu region (5.95 and 6.0 mu). It was a mixture of 1-acetyl- and 2-acetyl-butadiene-1,3 and this mixture is easily separated by gas chromatography. Most of the mixture (over 80%) is the 1-acetyl compound which has a slightly higher boiling point than its 2-isomer.

The osmium compounds corresponding to the above iron and ruthenium compounds show the same chemical behavior and can be also used for similar intermediates.

By reason of the inexpensive character of the iron compounds, these are preferred. The acylation conditions can be varied over the conventional ranges of temperature—e.g., −20 to +150° C., and pressure—e.g., below 1 mm. of mercury to several atmospheres, but it is preferred to use reactants at temperatures low enough so that they are not gaseous, and it is most convenient to have the reaction take place at atmospheric pressure. The combination of non-gaseous reactants and atmospheric pressure makes it a very simple matter to use a gas flush as described above. Different Friedel-Crafts catalysts provide different reaction velocities and aluminum chloride seems to be the most vigorous.

The cleavage to recover the free acylbutadienes can be carried out directly on the crude reaction mixture resulting from the acylation, as by carrying out the acylation in an autoclave at atmospheric pressure, and after the acylation is completed, introducing CO, sealing the autoclave and pressurizing. The CO can also be bubbled through the crude reaction mixture before the autoclave is sealed, so as to expel some or most of the HCl remaining as acylation by-product. However, it is also convenient to first separate the aqueous layer formed when hydrolyzing the acylation mixture, and to carry out the cleavage on the organic layer.

Cleavage takes place under carbon monoxide pressures of at least about 2 gauge atmospheres and at temperatures of at least about 100° C. Temperatures above 300° C. tend to cause excessive decomposition during the carbonylation, but this can be minimized somewhat by using pressures of 10,000 p.s.i.g. or more.

The butadiene iron subgroup metal tricarbonyls are fairly inert chemicals notwithstanding their ready acylation. They are not alkylated, nor are they readily cleaved or otherwise decomposed by conventional reagents other than CO. Strong acids, strong alkalis and even ultraviolet light and air do not cause any appreciable decomposition at reasonably elevated temperatures. This general inertness along with the fairly ready acylation is also characteristic of these compounds when the butadiene is substituted by alkyl or aryl groups having up to about 10 carbon atoms each as in isoprene, decadiene-4,6 and 1-phenyl-butadiene-1,3. At least one of the butadiene hydrogens must be unsubstituted so that it can be replaced by the acylation. For acyaltion, any acyl halide containing up to 20 carbon atoms can be used. Representative of such halides, aside from those of the above examples, are stearoyl bromide, alpha-naphthoyl chloride, the mixed acyl chlorides obtained by reacting tung oil fatty acids with $PCl_5$, formyl chloride, cinnamoyl fluoride, and p-toluene sulfonyl chloride.

At high temperatures such as 300° C. or higher, the acylated butadiene metal tricarbonyls of the present invention decompose gradually to deposit free metal in a form that makes these materials suitable for gas plating.

Obviously, many modifications and variations of the present invention are possible in the light of the above teachings. It is, therefore, to be understood that within the scope of the appended claims, the invention may be practiced otherwise than as specifically described.

What is claimed is:
1. A process for preparing an acylated butadiene, said process comprising
   (a) reacting a butadiene iron subgroup metal tricarbonyl, in the presence of a Friedel-Crafts catalyst, with a carboxyacyl halide having up to 20 carbon atoms, and wherein the radical bonded to the carbonyl halide group in said carboxyacyl halide is selected from the class consisting of alkyl and aryl radicals, and
   (b) cleaving the acylated product thus formed with carbon monoxide at a temperature of from 100° to 300° C. and at a pressure of at least 2 gauge atmospheres to produce said acylated butadiene.

2. The process of claim 1 wherein said carboxyacyl halide is acetyl chloride.

3. The process of claim 1 wherein said carboxyacyl halide is benzoyl chloride.

4. A process for preparing an acylated butadiene, said process comprising
   (a) reacting a butadiene iron subgroup metal tricarbonyl, in the presence of aluminum chloride catalyst, with a carboxyacyl chloride, wherein the radical bonded to the carbonyl group in said carboxyacyl chloride is selected from the class consisting of alkyl and aryl radicals, and
   (b) cleaving the acylated product thus formed with carbon monoxide at a temperature of from 100° to 300° C. and at a pressure of at least 2 gauge atmospheres to produce said acylated butadiene.

5. The process of claim 4 wherein said carboxyacyl chloride is acetyl chloride.

6. The process of claim 4 wherein said carboxyacyl chloride is benzoyl chloride.

7. A process for preparing acetyl butadiene, said process comprising
   (a) reacting butadiene iron tricarbonyl in the presence of a Friedel-Crafts catalyst with acetyl chloride, and
   (b) cleaving the acylated product thus formed with carbon monoxide at a temperature of from 100° to 300° C. and at a pressure of at least 2 gauge atmospheres to produce said acetyl butadiene.

8. The process of claim 7 wherein said Friedel-Crafts catalyst is aluminum chloride.

No references cited.

LEON ZITVER, *Primary Examiner.*

D. D. HORWITZ, *Assistant Examiner.*